US010105881B2

(12) United States Patent
Parmigiani

(10) Patent No.: US 10,105,881 B2
(45) Date of Patent: Oct. 23, 2018

(54) PROCESS FOR COMPRESSION-FORMING OF THERMOPLASTIC OBJECTS

(71) Applicant: C.G.M. S.P.A., Correggio (Reggio Emilia) (IT)

(72) Inventor: Corrado Saverio Parmigiani, Correggio (IT)

(73) Assignee: C.G.M. S.P.A., Correggio (Reggio Emilia) (IT)

( * ) Notice: Subject to any disclaimer, the term of this patent is extended or adjusted under 35 U.S.C. 154(b) by 246 days.

(21) Appl. No.: 14/391,657

(22) PCT Filed: Apr. 25, 2013

(86) PCT No.: PCT/IB2013/000772
§ 371 (c)(1),
(2) Date: Oct. 9, 2014

(87) PCT Pub. No.: WO2013/160751
PCT Pub. Date: Oct. 31, 2013

(65) Prior Publication Data
US 2015/0069661 A1    Mar. 12, 2015

(30) Foreign Application Priority Data

Apr. 27, 2012 (IT) .............................. RE2012A0032

(51) Int. Cl.
*B29C 43/00* (2006.01)
*B29C 43/52* (2006.01)
(Continued)

(52) U.S. Cl.
CPC ............ *B29C 43/006* (2013.01); *B29C 43/10* (2013.01); *B29C 43/36* (2013.01); *B29C 43/52* (2013.01);
(Continued)

(58) Field of Classification Search
CPC ................................................... B29C 43/006
See application file for complete search history.

(56) References Cited

U.S. PATENT DOCUMENTS 3,608,058 A * 9/1971 Coffman ................. B29C 43/54
264/313
6,419,862 B2 * 7/2002 Funakoshi .......... B29C 44/0415
264/155
(Continued)

FOREIGN PATENT DOCUMENTS

DE        3840355 A1    6/1990
DE       29700226 U1    5/1998
(Continued)

*Primary Examiner* — Matthew Daniels
*Assistant Examiner* — Patrick Butler
(74) *Attorney, Agent, or Firm* — Volpe and Koenig, P.C.

(57) ABSTRACT

The process includes a die comprising a bottom die (10) and a male part (20) able to close the cavity in such a way as to define a closed forming chamber (F). The bottom die (10) has an upper mouth that delimits the cavity (15), having an open upper surface substantially open in an upwards direction and a lateral surface internal of the cavity of the bottom die and forming an angle with the upper surface. The male part (20) has a central portion (21) able to close the surface of the cavity (15) and a peripheral edge able to adhere to the upper surface of the upper mouth, such as to realize a closing of the forming chamber only by means of contact along the upper surface, the peripheral edge lacking a vertical surface able to slide snugly contactingly with the lateral surface of the upper mouth (11). The process comprises: inserting a batch of non-spongy/foam thermoplastic material having a greater density than 0.9 Kg/dm3, in the solid state and in small pieces, into the cavity of the female component, supplying heat to the parts of the die, up to producing at least a partial melting of the batch located in the cavity of the die, nearing the two parts of the die to one another, by action of (Continued)

a thrust able to deform the batch in the at least partially molten state, the movement leading to a reduction of a distance between the upper mouth and the peripheral edge up to reciprocal contact thereof.

3 Claims, 7 Drawing Sheets

(51) Int. Cl.
| | |
|---|---|
| *B29C 43/10* | (2006.01) |
| *B29C 43/36* | (2006.01) |
| B29K 23/00 | (2006.01) |
| B29K 25/00 | (2006.01) |
| B29K 27/06 | (2006.01) |
| B29K 55/02 | (2006.01) |
| B29K 59/00 | (2006.01) |
| B29K 67/00 | (2006.01) |
| B29K 69/00 | (2006.01) |
| B29K 77/00 | (2006.01) |
| B29K 105/00 | (2006.01) |

(52) U.S. Cl.
CPC .. *B29C 2043/106* (2013.01); *B29C 2043/522* (2013.01); *B29C 2043/525* (2013.01); *B29K 2023/065* (2013.01); *B29K 2023/0633* (2013.01); *B29K 2023/12* (2013.01); *B29K 2025/06* (2013.01); *B29K 2027/06* (2013.01); *B29K 2055/02* (2013.01); *B29K 2059/00* (2013.01); *B29K 2067/003* (2013.01); *B29K 2067/006* (2013.01); *B29K 2069/00* (2013.01); *B29K 2077/00* (2013.01); *B29K 2105/251* (2013.01)

(56) References Cited

U.S. PATENT DOCUMENTS

| | | |
|---|---|---|
| 2002/0017742 A1 | 2/2002 | Kikuchi et al. |
| 2006/0174782 A1* | 8/2006 | Walker ............... B29B 17/0026 100/305 |
| 2010/0237537 A1* | 9/2010 | Parmigiani ........... B29C 43/184 264/265 |

FOREIGN PATENT DOCUMENTS

| | | |
|---|---|---|
| WO | 2011048477 A1 | 4/2011 |
| WO | 2012095692 A1 | 7/2012 |

\* cited by examiner (KNOWN ART)

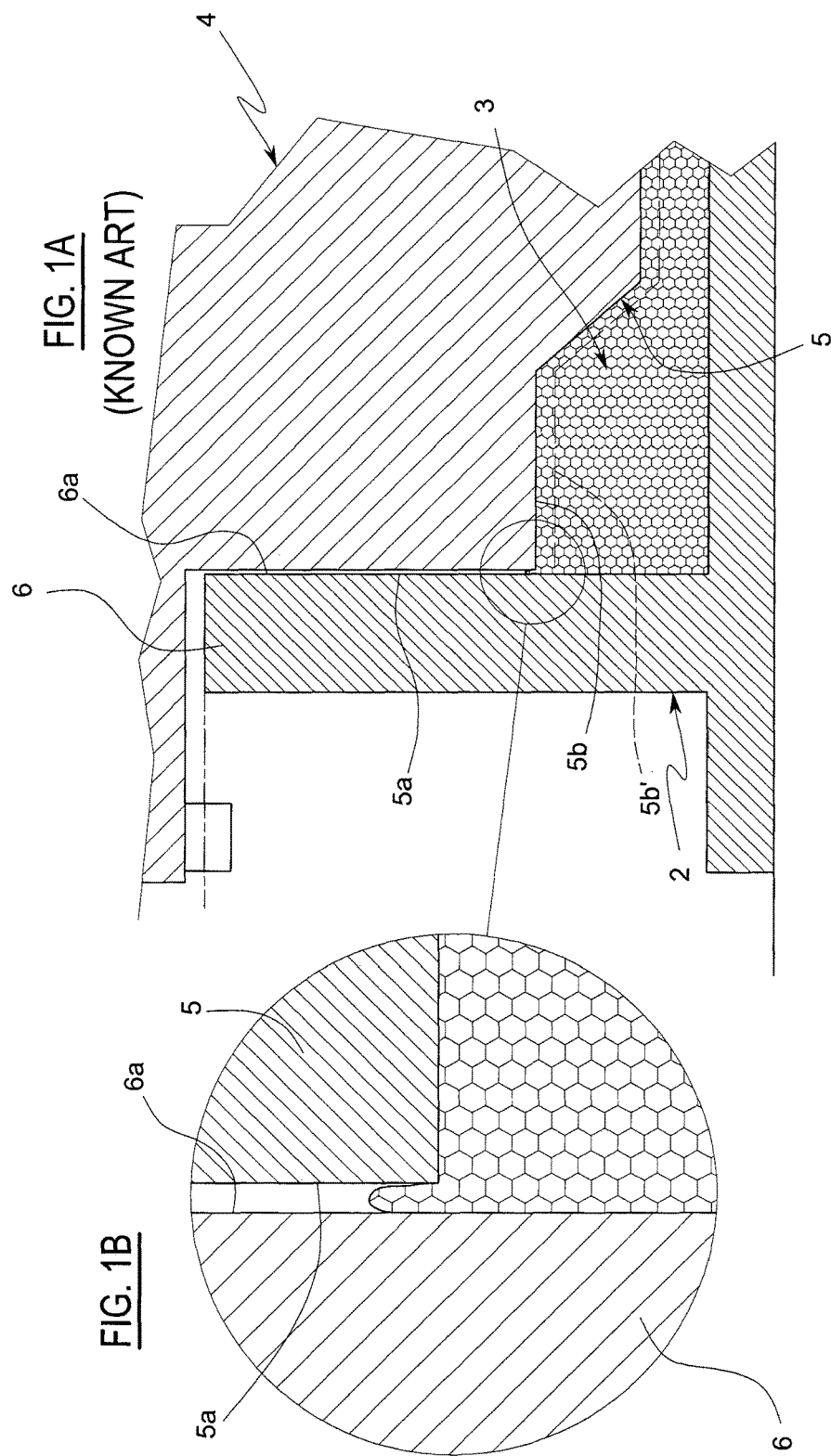

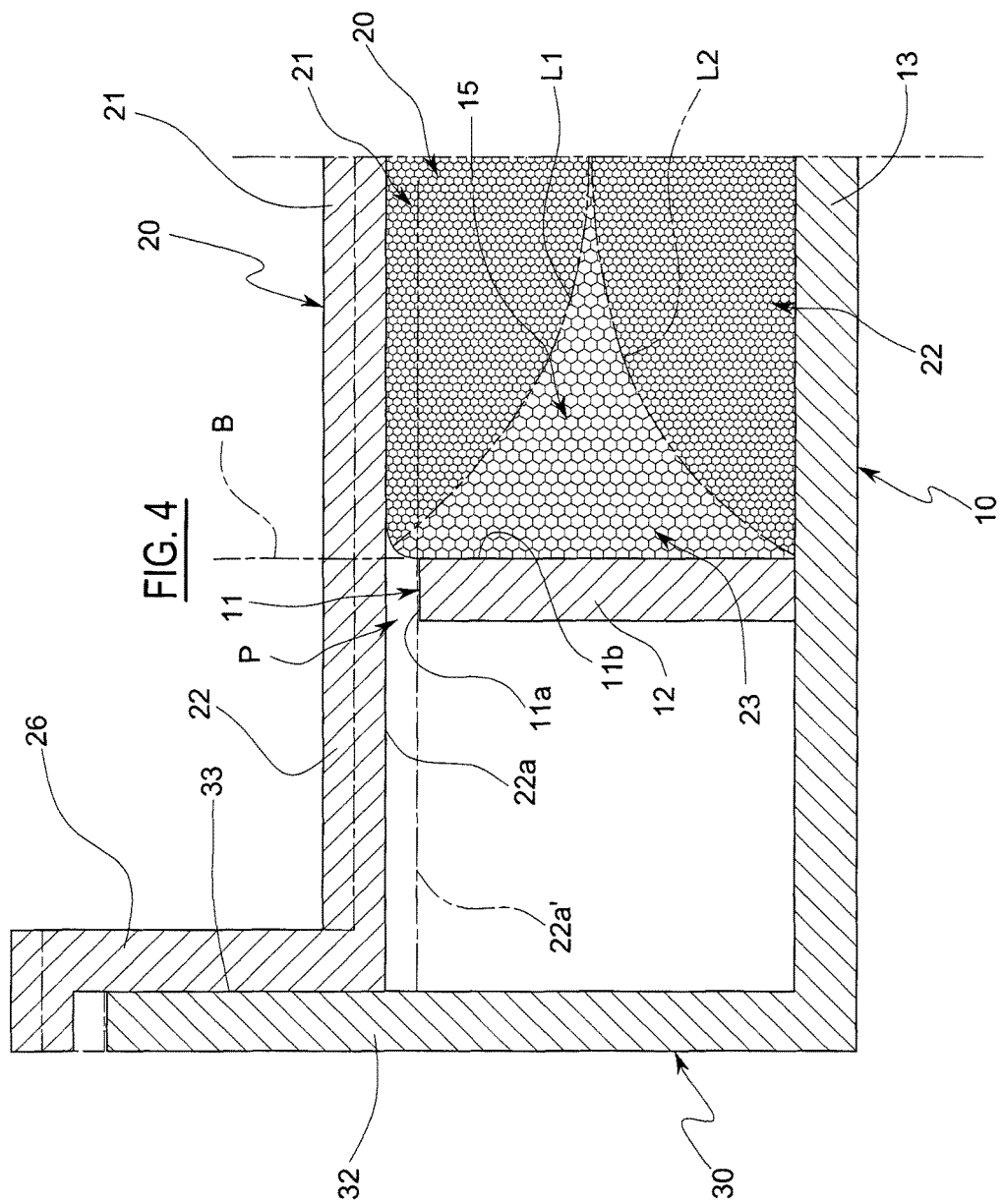

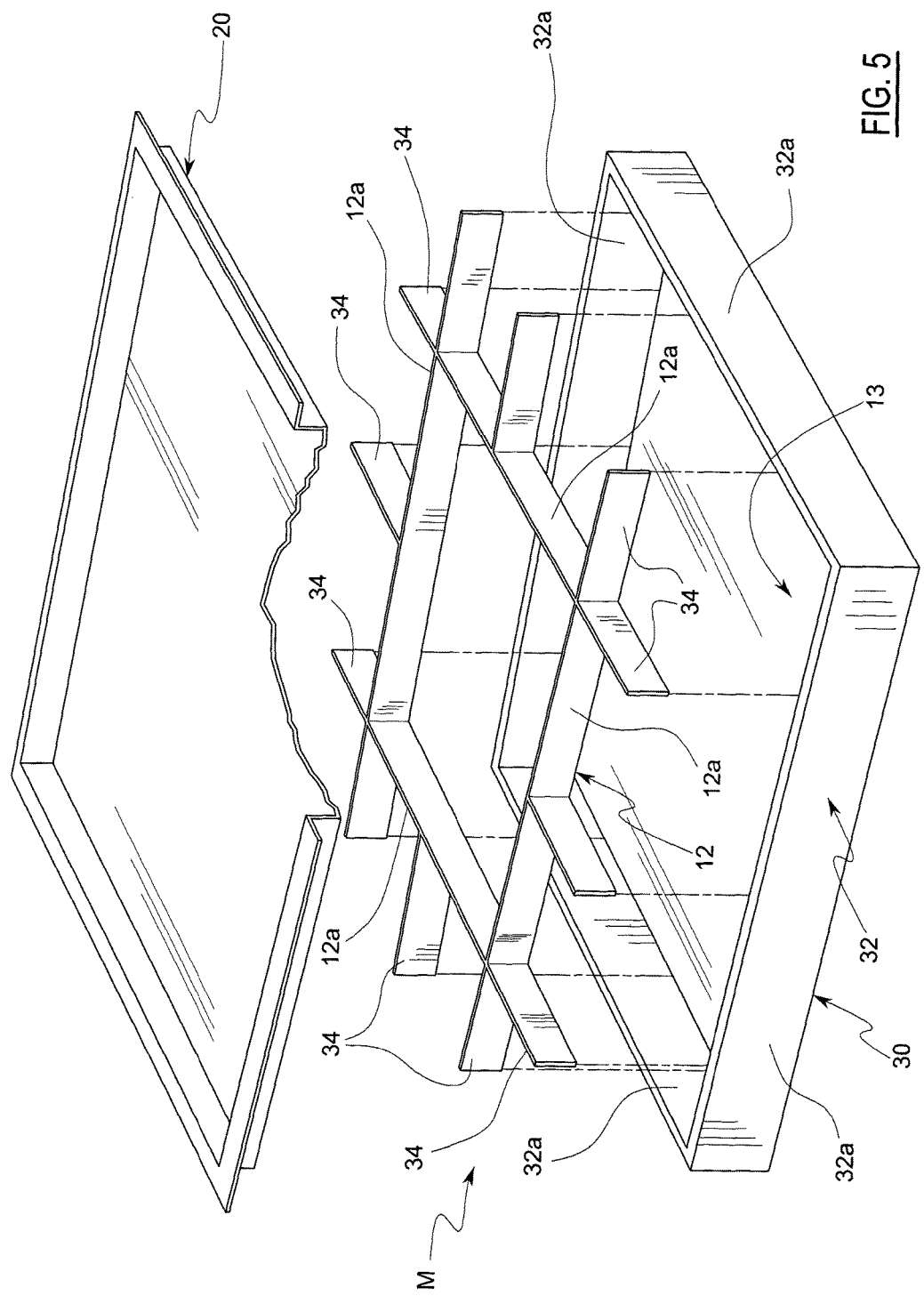

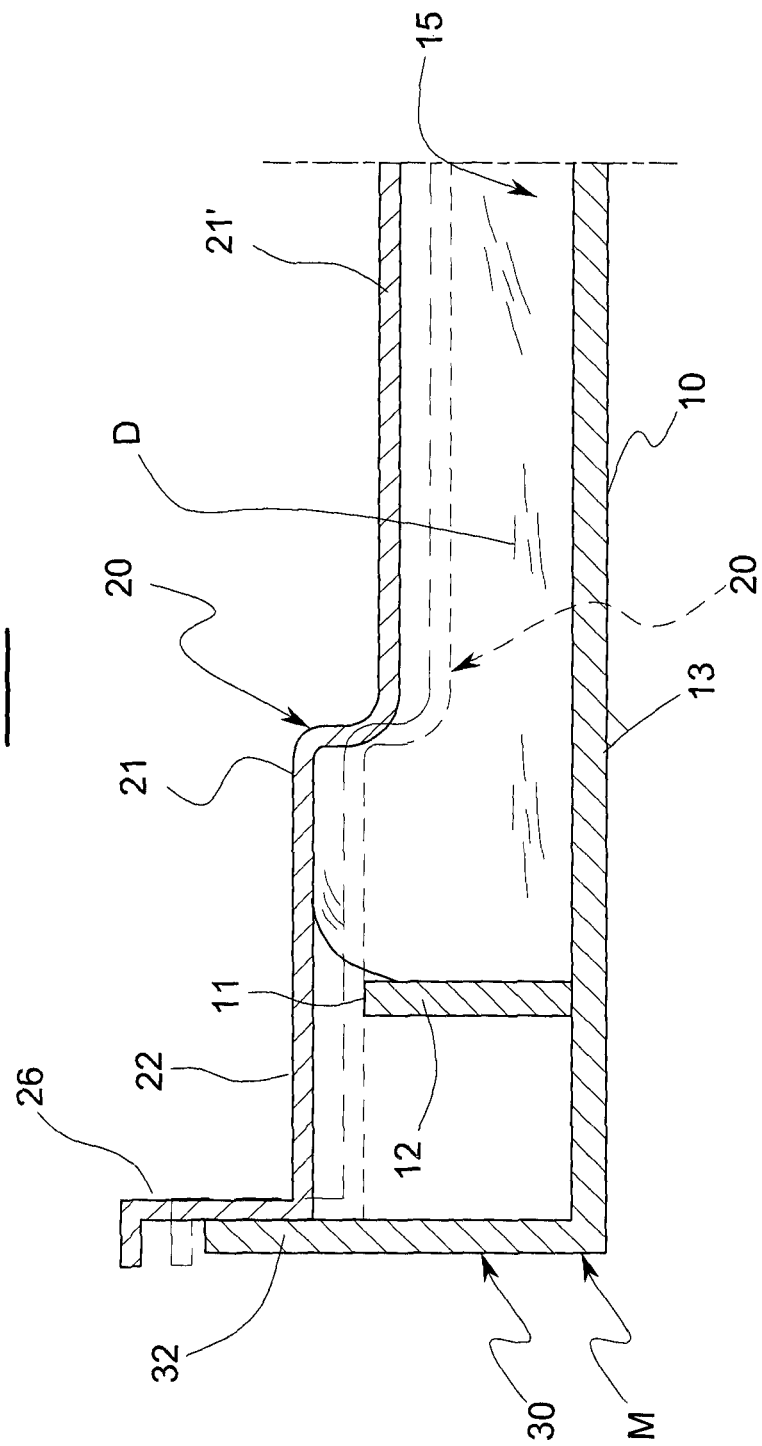

PROCESS FOR COMPRESSION-FORMING OF THERMOPLASTIC OBJECTS

TECHNICAL FIELD

The present invention relates to compression-forming, of objects made of thermoplastic material of the compact type, where this term means a non-spongy/foam thermoplastic material (such as for example polystyrene foam, polyurethane foam, etc.), devoid of cells containing air, having a density greater than 0.9 kg/dm3. The material is subjected to compression in the more or less viscous liquid state and forming takes place by means of a die comprising a bottom die (female part) having a cavity of the bottom die and at least one male part able to close the cavity so as to define a closed forming chamber that determines the shape of the object.

BACKGROUND ART

The most traditional and consolidated process for the forming of products based on compact thermoplastic material is injection moulding; this is the typical technological method for the manufacture of articles made of thermoplastic material in which material in liquid state is placed in a cavity of a permanent die (mould), driven by an "injection" force".

The injection moulding includes, in short, a "plasticizing and injection group", in which the polymer is melted, and a die into which molten polymer is injected, having a chamber that gives shape to the product. The apparatus uses plastic granules as basic raw material; the granules are made to pass inside a cylinder by means of a worm screw (Archimedes screw). The process of fusion inside the cylinder is achieved by means of heat induced by electrical resistances, and by friction generated by the movement of the Archimedes screw inside the cylinder.

The melting temperature (or glass transition in the case of amorphous materials) depends on the type of material that is used; normally it ranges from 160° C. for low density polyethylene (LDPE) up to 300° C. for polycarbonate (PC).

Once melted, the material is injected into the forming chamber through the action of the Archimedes screw. The injection pressure to which the forming cavity is subjected is usually of the order of 300-600 kg/cm2. The size of the presses and their energy consumption are strongly influenced by the surface of the product to be moulded, and the pressure applied during the injection step.

The die internally defines a closed forming chamber which determines the shape of the object to be obtained, enables the molten plastic to cool in a short time and ejects the finished solid product, by means of appropriate mechanical means such extractors.

DISCLOSURE OF THE INVENTION

The present invention relates to a process, developed more recently, which provides for the compression-forming of products of compact thermoplastic material inside dies which comprise a bottom die having a matrix cavity suitable for containing a batch of thermoplastic material in small pieces, and a male part, which penetrates the bottom die by reducing the volume of the cavity, up to closing the cavity so as to define a closed forming chamber which determines the shape of the object.

This process provides for:

insertion of a batch of material in solid form, transformed into relatively small particles that make it sufficiently fluid to be poured inside the die cavity and substantially occupy the lower part, supply of heat to the parts of the die such as to heat and soften the batch within the cavity up until it is more or less completely melted, penetration, more or less simultaneously with the supply of heat, of the male part of the die into the cavity until it is completely closed and defines the forming chamber.

An example of this technology is described in the patent publication US2002/17742.

An advantage of this process with respect to injection moulding is in the energy saving and lower value of the pressures involved, which involves much less robust and expensive equipment and lower energy consumption.

It is also possible to realise objects of relatively large size. For example it is practically possible to realize flat objects (panels) with a surface area of greater than 1 square metre; while it is not convenient to realize them by injection moulding because the process would require very large and expensive machines and would present actuation problems of complex and often insurmountable dimensions.

The dies used with this technology exhibit a male part which comprises a peripheral edge provided with a vertical surface capable of sliding in contact with the internal lateral surface of the upper mouth, and thus closing the cavity of the bottom die.

FIG. 1 illustrates an enlarged portion of FIG. 2 of the prior document US2002/17742. The bottom die 2 comprises an upwardly open cavity 3, suitable for containing a batch of thermoplastic material in the form of small pieces, having an upper mouth 6; the male part 4 comprises a central portion 5 able to close the cavity 3; in detail, the central portion 5 comprises a vertical surface 5a, capable of sliding, for a certain distance, in contact with the internal lateral surface 6a of the upper mouth in order to close the cavity 3. This coupling between the vertical surfaces 5a and 6a serves to close the cavity which encloses the material in the molten state, and then to prevent the escape of the material itself, while at the same time enabling a reciprocal vertical movement between male and female parts, up to complete closure of the die (used to define the forming chamber). All known dies operating by compression on a more or less viscous liquid material possess this characteristic.

A drawback associated with the process in question is the difficulty encountered in carrying out a complete evacuation of the air present in the forming cavity. The air cannot get out and remains trapped in the finished object, thereby affecting the mechanical characteristics thereof, and if the air bubbles remain at its external surface, damaging the exterior appearance.

This drawback is even more significant the larger the volume of the cavity of the bottom die.

An object of the invention is to provide an efficient and substantially complete evacuation of air from the cavity of the bottom die.

This and further objects are achieved by the invention as characterized in the claims.

The process according to the invention comprises, as already mentioned above, the use of thermoplastic material of a compact type, where this term means a non-spongy/foam thermoplastic material (such as for example polystyrene foam, polyurethane foam, etc.), devoid of cells containing air, having a density of greater than 0.9 kg/dm3.

The process uses a die provided with one or more die cavities inside which the granules of plastic material which make up the forming batch are deposited directly, which cavities are preferably pre-heated to a temperature of about 100-120 degrees Celsius.

The granules can be polymers and different from one another; is possible for example to mix polyethylene with polyamide or polystyrene.

It is useful that in the mixture there is a proportion of not less than 50% of base material polyolefins or polystyrenes that have melting and softening temperatures that are lower than the other thermoplastics and which are characterized by their binding capacity (colloidal) in the molten state.

There is also the possibility of mixing the polyolefins with materials of different origin from plastics such as paper, inert minerals, powdered metals, scraps of grain and wood, provided that the mixture obtained contains at least 50% of polymers with low melting point.

BRIEF DESCRIPTION OF THE DRAWINGS

The invention is described in detail herein below with the aid of the accompanying figures which illustrate an embodiment, by way of non-exclusive example, of an embodiment of the means that are suitable for realising the process.

FIG. 1A is an enlarged portion of FIG. 1.

FIG. 1B is an enlarged portion of FIG. 1A.

FIG. 4 is an enlarged detail of FIG. 3C at a stage just prior to the closing of the die.

FIG. 5 is a general perspective and exploded view of the die of FIG. 2.

FIG. 6 schematically shows a further embodiment of the die.

BEST MODE FOR CARRYING OUT THE INVENTION

Figure 1:
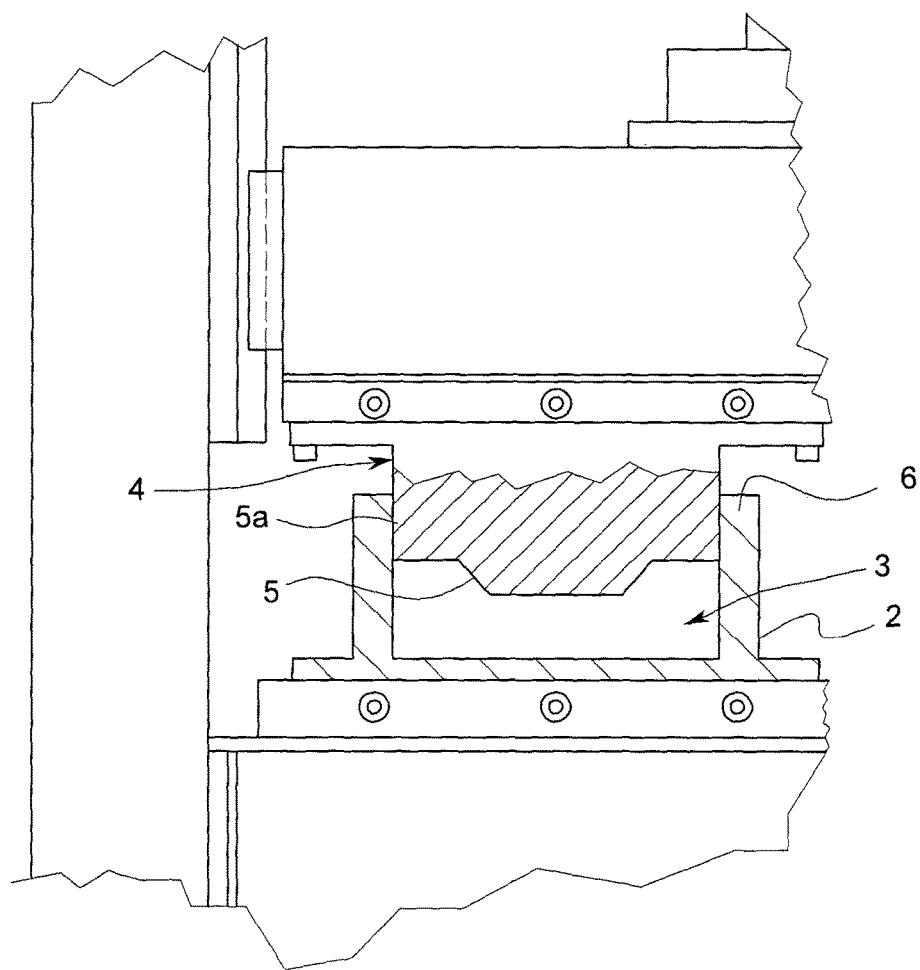
FIG. 1 is an enlarged portion of the die shown in FIG. 2 of the document of the prior art US2002/17742.

The process involves the use of a die, generally denoted by M, which comprises a bottom die 10 (female part) having a bottom die cavity 15, which is open substantially upwards, destined to contain a batch D of thermoplastic material in small pieces, and a male part 20, mobile with respect to the bottom die 10, having a central portion 21 destined to close the cavity 15 such that a closed forming chamber (F) remains defined in the die M, which determines the shape of the object.

The bottom die 10 has an upper mouth 11, which defines the upper perimetral edge of the cavity 15, with a total horizontal lie, having an upper surface 11a facing substantially upwards, and a lateral surface 11b internal of the bottom die 15, and forming an angle, typically a right angle, with the upper surface 11a.

The male part has a central portion 21 able to close the surface of the cavity 15 and a peripheral edge 22, which surrounds the central portion 21, having a lower surface 22a, facing downwards, able to adhere to the upper surface 11a of the upper mouth 11, such as to realise the closure (more or less sealed) of the forming chamber, which closure is carried out only by the contact of the lower surface 22a along the entire upper surface 11a, the peripheral edge 22 lacking a vertical lateral surface side capable of sliding in snug contact with the lateral surface of the upper mouth closing the cavity (15).

Figure 2:
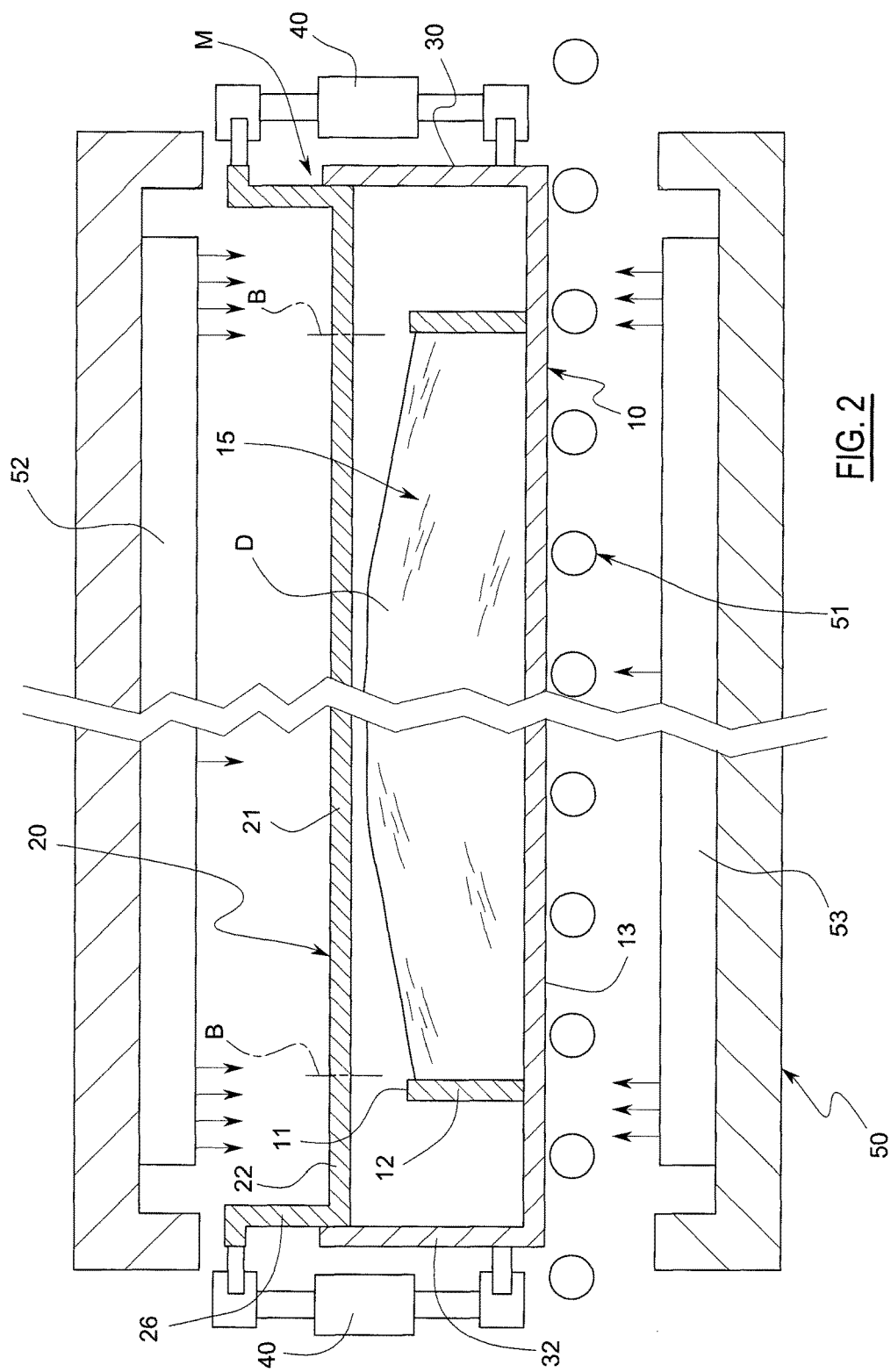
FIG. 2 is a section along a vertical plane of an apparatus die according to the invention, together with means for heating thereof.

In the embodiment illustrated in FIGS. 2 to 4, the central portion 21 and the peripheral edge 22 are joined together forming a continuous flat plate in which the end of one and the beginning of the other is not distinct: the central portion is the portion that closes the cavity 15 once the plate is resting on the mouth 11, while the edge 22 comprises the portion that rests on the surface 11a. FIG. 4 is an imaginary line B which separates the edge 22 from the central portion 21.

In the embodiment illustrated in FIG. 6, the central portion 21 presents at least a portion 21 deformed and projecting downwards with respect to the peripheral edge 22.

It is important to note that, in the prior art (FIGS. 1 and 1A), the male part 4 has a vertical side surface 5a, the which slidingly snugly couples with the internal lateral surface 6a of the upper mouth so as to close the cavity 3 and enable a mutual vertical movement between male and female parts, up to the complete closure of the die.

On the contrary, in the die according to the invention, the male part 20 has no vertical side surface that couples with the internal side surface 11b of the upper mouth 11.

In a preferred but not exclusive embodiment, the cavity of the bottom die 15 is delimited by a lateral wall 12, the upper edge of which defines the upper mouth, and by a wall of the lower base 13.

Furthermore, the lateral wall 12 is fashioned in a separate body with respect to the wall of the lower base 13 and is supported thereon without being solidly constrained thereto.

In a preferred but not exclusive embodiment, the lateral wall 12 of the bottom die is surrounded at a distance by a second external lateral wall 32 having a vertical internal surface 33. The male part comprises a third lateral wall 26, which surrounds the peripheral edge 22, having a vertical external surface 27 destined to couple with the internal surface 33 of the second wall 32, such as to define a sliding coupling which enables guided vertical translation of the male part 20 during the step of reciprocal approach of the two parts of the die during the forming process.

The embodiment of the die illustrated in FIGS. 2-5, is geometrically shaped so as to form rectangular and flat objects, for example plastic panels. The male part 20 is essentially formed by a flat rectangular plate and the cavity of the bottom die 15 has a parallelepiped shape exhibiting a limited height; once the male part 20 is resting on the mouth 11 of the bottom die, the forming chamber F is defined, determining a parallelepiped-shaped and relatively thin object (panel).

The male part 20 defines the central portion 21, destined to close the upper base of the cavity 15, and the edge 22, external of the central portion, which rests on the mouth 11.

The vertical third external side wall 26 is located on the periphery of the edge 22; in particular it is made in a single body with the horizontal part 21 and 22, which forms a vertical peripheral edge, having a vertical external surface 27.

The bottom die 10 comprises a vertical side wall 12, separable from the lower base 13, made up of four sides 12a which form a closed enclosure exhibiting a rectangular plan. The wall 12 is housed internally of a container 30, completely open on the upper base, which delimits a parallelepiped cavity. The wall 12 rests on the lower base of the recipient 13 which defines the base wall 13 of the bottom die. The recipient 30 is laterally delimited by a vertical wall consisting of four sides 32a, having a rectangular plan that defines the second lateral wall 32, positioned externally and at a distance from the lateral wall 12. The vertical wall 33 is formed in the upper part of the side wall 32, which vertical wall 33 slidingly couples in a vertical direction with the vertical external surface 27.

In plan view, the perimeter of the wall 32 is somewhat larger than the perimeter of the wall 12. To stabilise the plan position of the wall 12 resting on the base 13 inside the wall 32, flat vertical fins 34 are externally fixed to the wall 12, perpendicular to the external surface of the wall 12, which fins 34 extend outwards, some in a longitudinal direction and others in a vertical direction, an external end of which comes into contact with the internal surface of the wall 32. The wall 12, together with the fins 34 fixed thereto, is separable from the recipient 30 and once rested on the base 13 thereof, is stably wedged internally thereof.

FIG. 2 illustrates an example of equipment according to the invention. The die M inserted inside a heating kiln 50, which exhibits a linear roller conveyor 51 (or other means) by which the die M passes through the kiln chamber, and heating means 52 and 53 which radiate heat energy. The means 52 are arranged above and directed towards the male part 20, while the means 53 are placed below the bottom die 10 and are directed towards the lower wall 13 of the bottom die 10.

Thrust means 40, illustrated schematically in FIG. 2, are associated to the die M, and are solidly constrained to both the male part 20 and to the bottom die 10; the thrust means 40 provide a thrust capable of nearing the two die parts 10 and 20 to one another, up to the final closing of the die. Obviously the embodiments of the thrust means 40 can be many and various.

The process of the invention comprises insertion of a batch of thermoplastic material of a compact type, where the term refers to a non-spongy/foam material, (such as, for example, polystyrene foam, polyurethane foam, etc.), having a density of greater than 0.9 kg/dm$^3$, in solid form and in small pieces, within the cavity of the bottom die 10.

Preferably, the following materials are used:

| compact thermoplastic resin | melting temperature (or glass transition) |
|---|---|
| LDPE (low density polyethylene) | T = 160-220 |
| HDPE (high density polyethylene) | T == 170-230 |
| PP (polypropylene) | T = 190-270 |
| PS (polystyrene) not foamed | T = 190 |
| PVC polyvinyl chloride) | T = 210 |
| PA (polyamide) | T = 280 |
| POM (polyoxymethylene) | T = 220 |
| PET (polyethylene terephthalate) | T = 270 |
| PBT (polybutylene terephthalate) | T = 260 |
| PC (polycarbonate) | T = 300 |
| ABS (Acrylnitril Butadiene Styrene) | T = 230 |

The process is based on the use of compact materials (which do not give rise to cell-like structures containing air) which change state as a result of fusion (in which granules become molten liquid material having a higher or lower viscosity) and the subsequent cooling.

Polymers are preferably used which after melting and then cooling do not significantly change their original density. The raw material of origin of the process is in granules similar to wheat; they can be geometrically dissimilar to each other, for example with a cylindrical or spherical shape, or in the case of materials coming from recycling they can have an irregular shape. The size of the granules should not, however, be highly variable between them because the volume affects the time required for their fusion. Very different volumes would have very different melting times. A possible yardstick would be a value between 1 and 8 mm for each of the three dimensions of a granule.

The size of the granules is preferably less than 0.1 cm$^3$.

The batch of the material inserted is equal in weight to the product to be obtained.

Figure 3A:
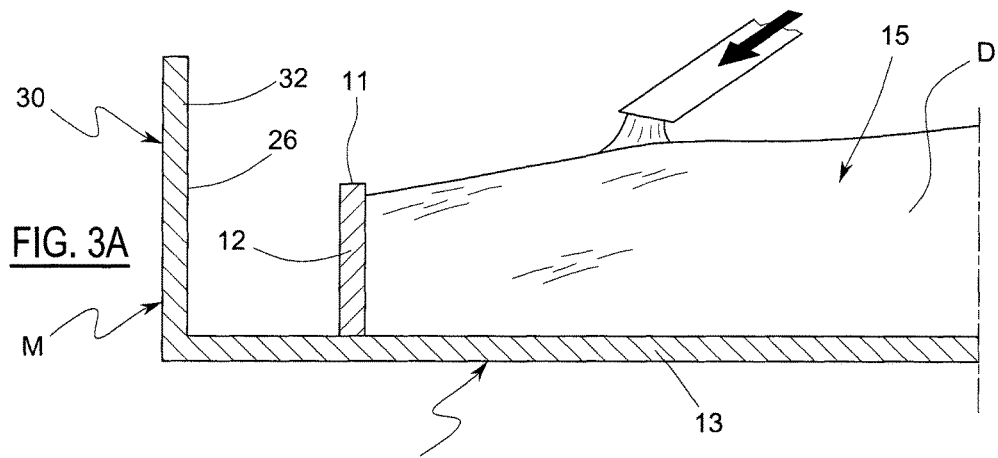
FIGS. 3A to 3C schematically show the die in three successive forming steps.
Figure 3B:
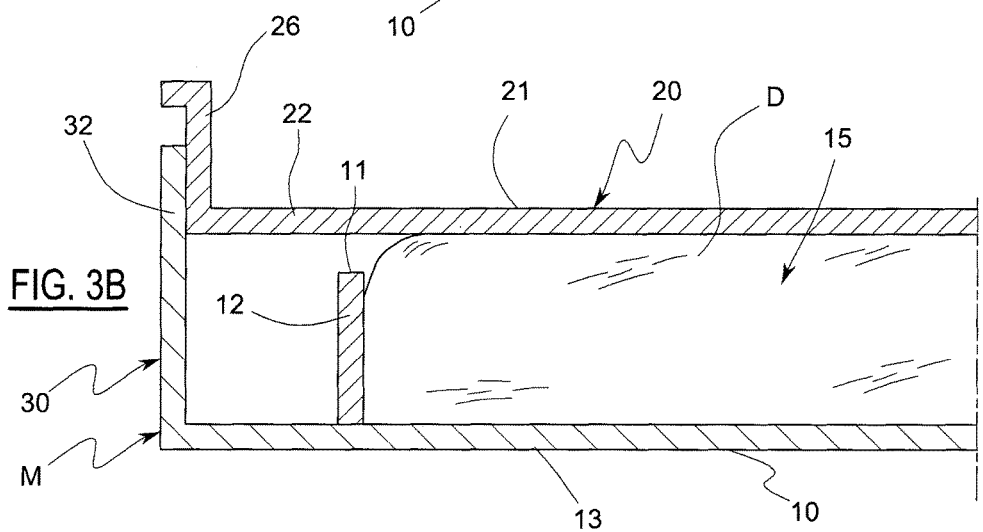
Figure 3C:
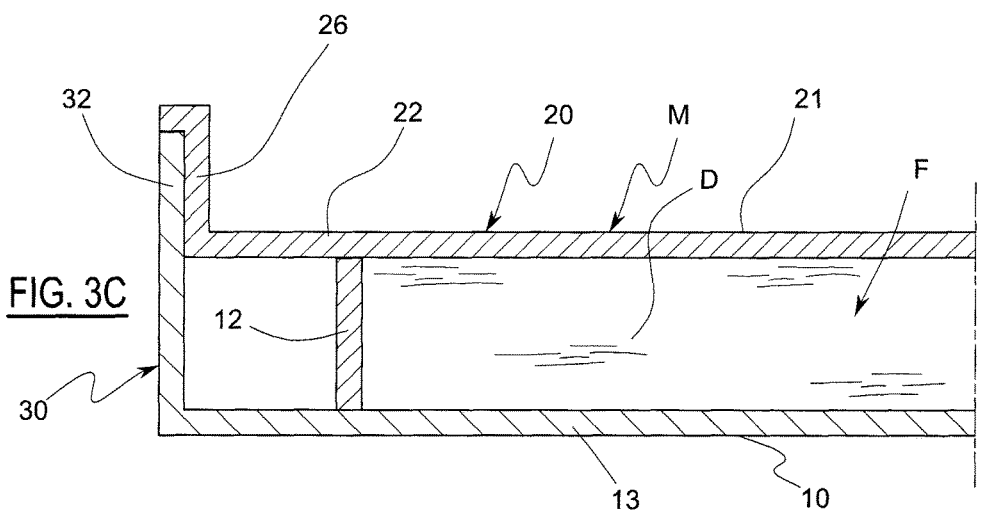

The batch is inserted at room temperature or pre-heated; in any way, when inserted, the granules of the material are in solid form, free and loose, so that the batch can be arranged loose within the cavity 15, to fill the cavity 15, as it has an almost fluid behaviour (FIG. 3A).

The batch, in loose form, can be deposited inside the cavity 15 using known automatic or manual means.

The process comprises providing heat to the parts of the die, to produce at least partial melting of the batch the die cavity.

The supply of heat to the die can begin before the insertion of the batch in the cavity 15, or it can begin after. It can also end before insertion of the batch.

The batch, optionally preheated, receives heat from the die by conduction and by convection. Obviously the first granules to be heated are those placed in contact with the internal surfaces of the die; then the granules nearest to them are heated, the heating proceeding from the surface of the die towards the internal part of the batch.

The process involves bringing together the two parts 10 and 20 of the die, behind the action of a thrust able to deform the batch placed in the cavity 15, at least in the partially molten state, which movement results in the decreasing of the distance between the upper mouth 11 and the peripheral edge 22 up to reciprocal contact, the cavity 15 being closed in this configuration, and the forming chamber that will give the object its final shape being defined.

Finally, the die M, and the molten material which fills the forming cavity F, are cooled and the formed product is extracted from the die.

The step of mutual nearing of the two parts of the die preferably begins at an intermediate moment during the supply of heat to the die, before all the granules forming the batch are completely united indistinctly in the mass of molten thermoplastic material. This nearly increases the degree of compaction and therefore the surfaces of mutual contact between the granules and between granules and the internal surface of the die, and therefore facilitates the transmission of the direct heat from the die to the granules and from the external granules towards the internal granules.

It has been observed that thanks to the process in question, an effective and essentially complete evacuation of the air initially present within the cavity can be achieved, in particular the air trapped between the granules of the batch D.

In the prior art, this is not possible: one explanation is that during the final step of closing the die, that is, when the penetration of the male part 4 is close to the final position of closure (see FIG. 1A, where the dashed line 5b' indicates the end of the lower surface 5b in the closed position), the mass of thermoplastic material now fills the whole volume of the cavity 3, also because an original part of the air is still present, more or less evenly distributed within the mass, the compression of the material caused by the penetration of the male into the cavity of the bottom die pushes the air to exit along the narrow escape slot created by the (small) play that exists between the surfaces of mutual coupling 5a and 6a. However, together with the air, the thermoplastic material is also pushed out (especially the more fluid part thereof) which infiltrates the escape slit, remains blocked inside it and tends to obstruct it. This behaviour is accentuated by the fact that being very close to the escape slot, the pressure in the material in the initial part, upstream, is correspondingly very high, and therefore the material consequently has a high propensity to penetrate into the slot.

The result of this is that the escape slit is prone to being clogged by the thermoplastic material before the cavity of the bottom die has reached the minimum volume with which it defines the forming chamber, with the die closed (the position is indicated with a dotted line 5b') and the consequence is that the air originally present in the cavity is not evacuated entirely satisfactorily.

This behaviour is significantly improved by the present invention due to the fact that even during the final closing step of the die, that is, when the approach of the male part 20 to the bottom die 10 is near to the final position of closure (see FIG. 4), the air can escape efficiently from the cavity 15 through a relatively wide slit P defined between the upper surface 11a of the mouth 11e of the bottom die and the lower surface 22a of the peripheral edge 22 of the male part. This slot P is very large because it corresponds to the distance remaining for the male part to reach the final closure position (indicated by the dashed line 22a' in FIG. 4).

The width of the slit P varies and gradually decreases as the male part penetrates into the bottom die: however, only at the extreme end of the penetration does it reach, for a very short time (when the surface 22a is a few tenths/hundredths of a millimeter away from the final position 22a'), the same values that the output slot has in the prior-art case described above.

Although a small portion of material can be pushed through the slot P, this still does not block the passage of the air.

The result of this is that the escape slit P is not blocked by the thermoplastic material, with the result that the air originally present in the cavity is very satisfactorily evacuated.

In a preferred aspect of the process, the supply of heat to the die takes place in a differentiated way with respect to the various parts of the die, so that the lower base wall 13 and the central portion 21 of the male part are heated at a higher temperature than the side wall 12 of the cavity 15.

This differentiation is obtained advantageously by means of the preferred embodiment of the die illustrated in FIGS. 4 and 5.

Heat is supplied to the die by external means. Examples: by means of heating with infrared radiation 52, 53, or electric lamp heating means, or gas-combustion heating means, or other means, arranged such as to act directly from above on the central portion 21 of the male part, and from below, directly on the wall of the lower base 13.

The lower wall 13 and the central portion 21 are struck directly by the heat emitted by the heating means 52, 53, while the side wall 12 is not struck by the radiant heat. In particular, the side wall 12 is covered, with respect to radiation of heat from the means 52 positioned above the die, by the peripheral edge 22 of the male part, which extends externally beyond the upper mouth 11, and is covered with respect to radiation of heat from the means 52 placed below the die, by the peripheral edge of the lower wall 13 of the bottom die, which extends externally beyond the rest line thereon of the side wall 12.

A smaller amount of heat reaches the side wall 12 because it is heated indirectly by conduction via the contact with the bottom wall 13 and by convection via the hot air inside the oven 50. The temperature that it reaches remains, therefore, significantly lower than the temperature reached by the central portion 21, which is struck directly by the energy of the calorific radiating means 52 and 53.

It has been experimentally found that this aspect facilitates the evacuation of air out of the die.

One explanation is that thanks to the temperature difference between the elements that make up the die there is also a differentiated situation in the degree of fusion of the material inside the die cavity during the nearing step of the two die parts. The areas placed directly or in any case closer to the internal surface of the central portion 21 and the lower wall 13 will be brought to relatively higher temperatures, and progressively higher the greater the proximity to the internal surfaces; while the area positioned in contact with the side wall 12 is brought to relatively lower temperatures—in a direct relation with the distance of the lateral wall 12 from the internal surface.

Consequently, the parts of material arranged in proximity of the lateral wall 12 remain closer to the initial solid state, compared to the more fluid state of the other zones of the material. A schematic illustration of this situation is shown in FIG. 4. Three separate zones Z1, Z2 and Z3 are shown, separated by two lines L1 and L2 (schematic) which substantially join the central part of the cavity filled with material with the top and respectively with the bottom of the lateral wall 12; the zone Z3 placed near the wall 12 has a degree of fusion that is lower than the other two zones Z1 and Z2, and within it are parts which are still not completely melted or in any case are melted to a smaller degree, than the other parts Z1 and Z2. Thus the air present in the material is pushed out from the die through the zone Z3 that has (as long as it has not been completely brought to the liquid state) a structure that has more micro-passage which facilitate the evacuation of air through it up to the top of the wall 12 and also through the lower end of the wall 12, which, being simply rested on the lower wall 13, exhibits a slit which allows the air to escape from the cavity of the upper die.

During the reciprocal nearing of the two die parts (FIGS. 3B and 3C), the granules of the thermoplastic material positioned inside the cavity 15 are heated by the two die parts and at the same time are compressed inside the cavity 15; the compression action promotes and accelerates the melting of the particles themselves.

As the granules become more liquid, they tend to fill the voids and to join together forming a continuous mass; as the granules melt and aggregate, the air initially present between granules or within the granules themselves is removed. Conversely, the more solid the granules (as in the initial stage), the more passages there are between a granule and another, allowing the air to escape.

The air is then distanced from the more liquid zones (Z1 and Z2), i.e. where the melting is more advanced, positioned closer to the internal surface of the central portion 21, the areas in which the fusion is less advanced (Z3) and there are still incompletely-melted granules which form passages for the air to move through.

The melting of the granules proceeds, starting from the internal surfaces of the elements of the die, and especially of the central portion 21 of the male part 20 and the lower wall 13, which are the hottest, and is directed towards the central zone. The air present in these areas is removed through the central areas and the lateral zones positioned near the side wall 12, which has lower temperature.

In the vicinity of the closing phase of the die (see FIG. 4), zone Z3, at the lateral wall 12, is in a less advanced stage of melting which enables air to pass through and exit from the cavity 15, until the die is completely closed.

Thus an effective and essentially complete evacuation of air from the forming chamber F of the die is achieved.

The invention claimed is:

1. A compression-forming process of objects made of a compact thermoplastic material, the method comprising:
providing a die comprising two parts (10, 20):
 a bottom die (10) having a bottom die cavity (15) suitable for containing a batch of compact thermoplastic material in small pieces,
 a male part (20), mobile with respect to the bottom die (10), able to close the cavity in such a way as to define a closed forming chamber (F) which determines the shape of the object,
 the bottom die (10) having a lateral wall (12) with an upper mouth (11) that delimits the cavity (15), having an open upper surface (11a) substantially open in an upwards direction and facing a lower surface (22a) of a peripheral edge (22) of the male part (20), and a lateral surface (11b) internal of the cavity of the bottom die and forming an angle with the upper surface (11a),
 the male part (20) having a central portion (21) able to close the cavity (15) and the peripheral edge (22) with the lower surface (22a) able to contact the upper surface (11a) of the upper mouth, such as to realize a closing of the forming chamber only by means of contact along the upper surface (11a), the lower surface (22a) of the peripheral edge (22) being adaptable to abut the upper surface (11a) of the upper mouth (11) when closing the cavity,
inserting a batch of compact thermoplastic material having a greater density than 0.9 Kg/dm$^3$, in the solid state and in multiple pieces, sized to fit in the cavity of the bottom die,
supplying heat to the parts of the die, up to producing at least a partial melting of the batch located in the cavity of the die,
moving the two parts (10,20) of the die to one another, by moving the upper male part (20) into the bottom die (10) by action of a thrust (40) in order to deform the batch in the at least partially molten state, up to a distance to create a slot (P) between the upper surface (11a) of the upper mouth (11) and the lower surface (22a) of the peripheral edge (22),
de-aerating the material by allowing air to exit from the cavity (15), escaping through the slot (P),
further moving two parts (10,20) of the die to reduce the distance between the upper surface (11a) of the upper mouth (11) and the lower surface (22a) of the peripheral edge (22) up to a mutual contact thereof and
final closing of the die.

2. The process of claim 1, wherein the step of nearing the two parts of the die to one another starts in an intermediate moment of the supply of heat to the die, before all the granules forming the batch are completely united indistinctly in the mass of molten thermoplastic material.

3. The process of claim 1, wherein the bottom die cavity is delimited by a lateral wall (12), an upper edge of which defines the upper mouth (11), and by a lower base wall (13), and supply of heat to the die is done in a differentiated way with respect to the various parts of the die, such that the lower base wall (13) and the central portion (21) of the male part are brought to higher temperatures with respect to the lateral wall (12).

* * * * *